(12) United States Patent
McNeil et al.

(10) Patent No.: US 6,404,570 B1
(45) Date of Patent: Jun. 11, 2002

(54) DISK DRIVE WITH ADAPTIVE CHANNEL OPTIMIZATION

(75) Inventors: Michael McNeil; Andrew W. Davis, both of Boulder; Larry Koudele, Longmont, all of CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/432,826

(22) Filed: Nov. 2, 1999

Related U.S. Application Data (63) Continuation of application No. 08/735,781, filed on Oct. 23, 1996, now Pat. No. 5,995,305, which is a continuation of application No. 08/160,496, filed on Dec. 1, 1993, now abandoned.

(51) Int. Cl.[7] .............................................. G11B 27/36
(52) U.S. Cl. ........................ 360/31; 360/77.02; 360/53; 360/46; 360/67; 360/68; 360/65; 360/51
(58) Field of Search ................................ 360/31, 77.02, 360/53, 46, 67, 68, 65, 75, 51, 78.04, 78.14, 77.08; 324/212, 226; 714/701, 704, 769, 770, 774

(56) References Cited

U.S. PATENT DOCUMENTS

| | | |
|---|---|---|
| 3,553,390 A | 1/1971 | Krause |
| 3,753,249 A | 8/1973 | Silverman |
| 4,321,621 A | 3/1982 | Kinjo et al. |
| 4,513,333 A * | 4/1985 | Young et al. .................. 360/31 |
| 4,530,020 A | 7/1985 | Sutton |
| 4,542,428 A | 9/1985 | Yanagi |
| 4,578,721 A | 3/1986 | Brannan, Jr. |
| 4,675,758 A | 6/1987 | Tanaka |
| 4,725,968 A | 2/1988 | Baldwin et al. |
| 4,779,148 A | 10/1988 | Ozawa |
| 4,821,125 A | 4/1989 | Christensen et al. |
| 4,890,174 A | 12/1989 | Chalmers et al. |
| 4,939,599 A | 7/1990 | Chainer et al. |
| 5,079,653 A | 1/1992 | Gauthier et al. |
| 5,121,262 A | 6/1992 | Squires et al. |
| 5,150,050 A | 9/1992 | Genheimer et al. |
| 5,185,681 A | 2/1993 | Volz et al. |
| 5,270,880 A | 12/1993 | Ottesen et al. |
| 5,353,170 A | 10/1994 | Fung et al. |
| 5,353,177 A | 10/1994 | Yanagibashi |
| 5,408,367 A | 4/1995 | Emo |
| 5,455,730 A | 10/1995 | Dovek et al. |
| 5,995,305 A * | 11/1999 | McNeil et al. ................. 360/31 |

FOREIGN PATENT DOCUMENTS

| | | |
|---|---|---|
| JP | 02-40178 | 2/1990 |

* cited by examiner

Primary Examiner—Alan T. Faber
(74) Attorney, Agent, or Firm—David M. Sigmond

(57) ABSTRACT

Adaptive channel optimization in a disk drive is achieved by selecting a track of the recording medium and then writing a first data pattern to opposite sides of the selected track. The first data pattern is written a certain percentage off-track in relation to the centerline of the selected track. A second data pattern is then written directly on the selected data track and the off-track margin is determined as a function of how far the recording head can be positioned away from the center of the selected track during reading of the second data pattern while meeting a specified error rate. The off-track margin test is repeated iteratively using a combination of channel variable settings in order to find a set of variable settings which provides an optimal performance criterion for the drive.

48 Claims, 5 Drawing Sheets

DISK DRIVE WITH ADAPTIVE CHANNEL OPTIMIZATION

This application is a continuation of Ser. No. 08/735,781 filed Oct. 23, 1996, U.S. Pat. No. 5,995,305 which is a continuation of Ser. No. 08/160,496 filed Dec. 1, 1993 abandoned.

FIELD OF THE INVENTION

The present invention relates generally to the field of magnetic recording; more particularly, to circuits, systems and algorithms for adaptively controlling the performance of the read/write channel in a disk drive recording system.

BACKGROUND OF THE INVENTION

Modem disk drive recording systems typically rely upon a flat, circular platter having a surface which has been coated with a magnetic material for the storage of information by selective polarization portions of the magnetic surface. In such systems, a transducer or head is positioned over the magnetic surface of the rotating disk. By energizing coils in the transducer, magnetic flux can be generated to polarized selective portions of the disk surface. Likewise, the magnetic flux emanating from the disk surface from previously recorded data can be detected by the transducer in a similar manner. The presence or absence of polarity transitions is recognized by the disk drive electronics by means of a set of binary signals. An electronic data processing circuit, commonly known as a read/write data channel, is employed for this purpose.

For example, during the reading process the read channel converts the voltage waveform of the transducer output signal to a digital waveform which should be the same as the original modified frequency modulation signal. A general discussion of data channel operation in a rigid disk drive assembly is provided in Magnetic Recording, Vol. II Computer Data Storage by Mee and Daniel, McGraw-Hill, 1988, pp. 155–162.

Experimental techniques for analyzing the performance of a digital magnetic recording read/write channel are well-known in the field of disk drives. Numerous factors can affect the strength of the polarization of the magnetic surface in a manner which interferes with normal data reproduction. For example, defects in the magnetic disks, crosstalk between adjacent tracks of the disk, and intersymbol interference in reoccurring noise transients all contribute to the data read/write error rate of the disk drive. Theoretical models have been presented to predict the most effective utilization of a read/write channel in order to improve the channel error rate in the face of the combined effects of the above listed factors. By way of background, an article entitled "*Effect of Bit Shift Distribution On Error Rate In Magnetic Recording*," by Katz and Campbell, IEEE Transactions On Magnetics, Vol. MAG-15, No. 3, May, 1979, describes such a theoretical model.

For some time, practitioners have struggled to develop various techniques for eliminating the presence of false or missing pulses from the raw data signal. The goal of such techniques is generally to optimize the raw soft error rate performance of the disk drive channel. The raw soft error rate refers to the frequency of errors that occurs due to the susceptibility of the read channel signal to various factors such as crosstalk and intersymbol interference. In basic terms, the raw soft error rate means that the data reproduced should be the same as the data were originally written to the magnetic medium.

To improve the error rate of a magnetic recording system, prior art approaches have generally provided for read/write data channels that are programmably adaptable in processing data signals transferred to and from the read/write head. For example, U.S. Pat. No. 5,121,262 describes programming elements for determining whether data signals transferred from the medium exceed a programmable data discrimination level, and whether data signals transfer from the medium occur within a data signal window whose timing is relative to a data clock signal. Another example of an adaptive variable threshold qualification level circuit for disk drives is described in U.S. Pat. No. 5,150,050. In the latter system, a qualification level generator circuit generates a qualification level signal which varies in value depending upon the address portion of the magnetic disk.

One of the problems associated with prior art adaptive read/write channel controls has been their focus on the measurement criterion of timing margin and threshold margin. Additionally, past approaches rest on the assumption that disk drives always read on track; that is, that the head or transducer is optimally positioned over one of the concentric data tracks defined on the surface of the recording medium. In a disk drive system subject to real-world environmental influences, however, external forces such as mechanical shock and vibration often cause the head to move off-track.

What all of this means is that the true test of whether an adaptive algorithm works in an actual disk drive is not only related to how good its timing and threshold margins are on-track, but also how wide its erase bands are off-track Once the transducers or heads are positioned slightly off-track, noise from adjacent tracks becomes a serious problem. Thus, a disk drive system may have its read/write channel performance optimized under ideal on-track conditions, while under real operating conditions the drive will either fail or perform non-optimally due to poor off-track margin control.

Therefore, what is needed is an adaptive read/write channel which can optimize the raw soft error rate performance of the disk drive, while taking into account the realistic environmental and operating conditions that the drive normally experiences.

SUMMARY OF THE INVENTION

The present invention covers an apparatus and method of adaptive channel optimization for a disk drive. The disk drive is of a type which includes a recording head for reading/writing information from/to a magnetic medium.

In one embodiment of the present invention, adaptive channel optimization is achieved by a process that includes the initial step of selecting a track of the medium. Next, a first data pattern is written to opposite sides of the selected track. The first data pattern is written a certain percentage off-track in relation to the centerline of the selected track.

After the first data pattern has been written off-track, a second data pattern is then written directly on the selected data track. The off-track margin is then determined as a function of how far the recording head can be positioned away from the center of the selected track during reading of said second data pattern while meeting a specified first error rate. The off-track margin test is repeated iteratively using a combination of channel variable settings in order to find a set of variable settings which provides an optimal performance criterion for the drive.

In another embodiment, the present invention is implemented in a disk drive comprising a magnetic data storage media having a plurality of data tracks, a transducer, and a means for positioning the transducer over a selected data track of the storage medium. A data channel coupled to the transducer effectuates data recording to and from the selected data track. The data channel produces a read data signal during reading of data from the surface of the magnetic medium, and a write data signal during writing of data to the storage medium.

The recording performance of the data channel is affected by a plurality of variable control signals. Settings for these variable control signals are generated by an apparatus coupled to the data channel. The apparatus generates a combination of settings for the variable control signals, the combination optimizing the recording performance of the data channel for the selected track by utilizing a measurement criterion which includes off-track margin. In a preferred embodiment, the apparatus is incorporated in the data channel as a circuit module which resides on the same printed circuit board as the data channel circuitry.

BRIEF DESCRIPTION OF THE DRAWINGS

The present invention will be understood fully from the detailed description which follows and from the accompanying drawings, which, however, should not be taken to limit the invention to this specific embodiments shown, but are for explanation and understanding only.

DETAILED DESCRIPTION

An apparatus and method for optimizing head-medium-channel performance is disclosed. In the following description, numerous specific details such as currents, frequencies, distances, etc., are set forth in order to provide a thorough understanding of the present invention. It will be obvious, however, to one skilled in the art that these specific details need not be employed to practice the present invention. In other instances, well-known circuits, measurements, etc., have not been described in detail in order to avoid unnecessarily obscuring the present invention.

There are a number of variable factors that give rise to several problems in adaptive read channel circuits. For example, variability exists in the equalizer circuitry—including the filter circuitry—which is required for read/write channel operations. Influencing the equalizer circuitry is the variability of the bandwidth of the filter. Other variables present in the read/write channel include the amount of boost in the equalizer circuitry, the threshold level within the threshold circuitry of the channel, and the write current. The recording head itself is also a large source of variability in the channel, affecting such variables as write current.

In the process of testing a disk drive to determine either whether the drive will pass or fail based on an acceptable soft error rate, or during the process of optimizing the channel variables to improve the head's performance, several criteria are measured in conjunction with the present invention. These criteria include timing margin, threshold margin, and most importantly, off-track margin. Both timing margins and threshold margins are well-understood criteria commonly used to optimize channel performance in prior art systems.

By way of example, boost of the channel in the spectral region of the recording head provides the best match of pulse shape to the highest linear recording density, i.e., mean shifts resulting from intersymbol interference are minimized. Bandwidth cut-off is optimized to reduce noise power resulting primarily from differentiation, but this is normally traded-off against the requirements of pulse shape. Optimizing pulse width and noise is traditionally determined by finding the dominant noise source from the pulse shape (mean shifts), write asymmetry (mean shifts), channel noise (Gaussian distributions) or medium noise (Gaussian distributions). Iterations between bandwidth and boost values as two separate degrees of freedom are usually used to find an optimal solution.

As it turns out, timing margins are important only to a degree. The most important source of soft errors are threshold failures. At low thresholds, the error rate is dominated by "drop-ins" or extra bit events, whereas at high thresholds the error rate is dominated by "dropouts", or missing bit events. In accordance with the present invention, write process effects from the recording head are combined with readback optimization in the channel using adaptive write current, equalizer boost, filter bandwidth cut-off, and qualifier threshold level. While timing and threshold margins are measured in the optimization process, the crux of the invention is the use of off-track margins as the ultimate criterion measure of successful optimization.

Figure 1:
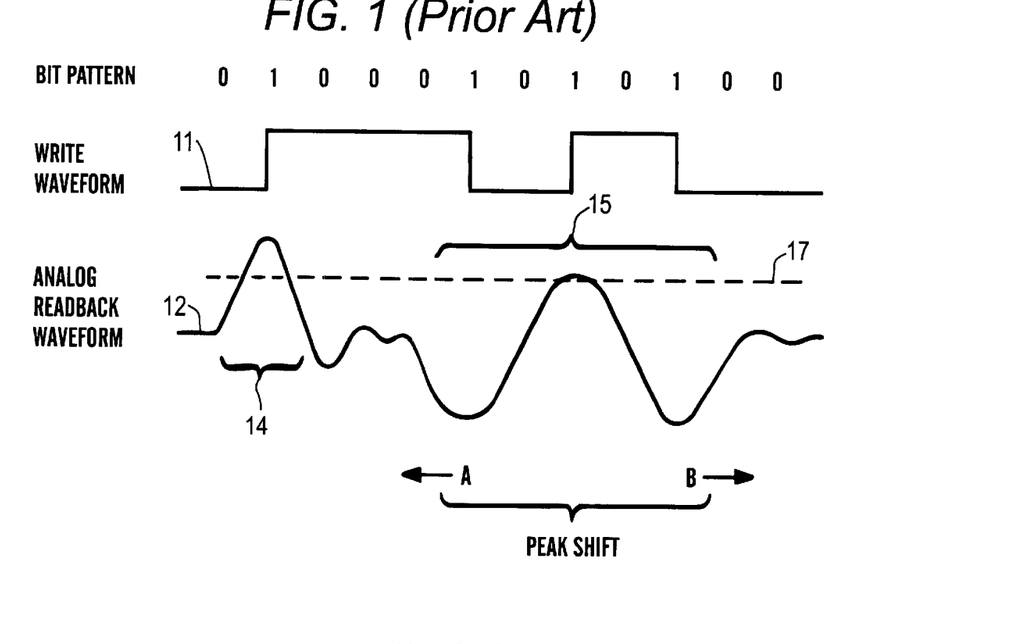
FIG. 1 illustrates a sample write waveform corresponding to a digital bit pattern, and the associated analog readback waveform.

To better understand the present invention, consider the waveform patterns shown in FIG. 1. FIG. 1 illustrates a write waveform 11 consisting of a series of digital pulse transitions corresponding to a bit pattern of data As can be seen, a transition of write waveform 11 corresponds to the presence of a "1" in the corresponding bit pattern. Directly below waveform 11 is an analog readback waveform 12. Waveform 12 represents an exemplary analog signal readback head from a magnetic medium storing write waveform 11. Waveform 12 is characterized by an isolated transition 14 followed by a tri-bit transition 15.

In the normal operation of a drive, noise is often injected onto an Isolated transition, producing jitter. Since a read channel operates by taking the first derivative of the analog signal received from the head, the presence of noise on waveform 12 often results in timing position errors. Another source of error results from pulse interferences (e.g., intersymbol interference) that cause mean shifts in the readback signal. For example, intersymbol interference tends to affect tri-bit 15 by forcing peaks A and B out in time. Again, these types of noise problems can, cause timing shift errors such that the readback waveform 12 does not correspond exactly to write waveform 11.

Besides timing shifts, the other degree of freedom in the read channel is represented by threshold errors. FIG. 1 illustrates an arbitrary threshold level 17 which is useful in detecting the presence of recorded information. Whenever analog readback waveform 12 crosses threshold level 17, a transition in the readback waveform is detected. Usually, the threshold level is set above the undershoots and noise, yet below the level at which signal peaks may be reduced in amplitude due to noise (e.g., intersymbol interference, etc.).

One of the important advantages of the present invention is that it recognizes that off-track noise is the most significant noise source in the channel, and that it also results primarily in threshold errors. The degree to which a head works off-track is not only related to how good its timing and threshold margins are on-track, but also to its off-track performance. The reason for this is because the moment that the heads are positioned over off-track noise, the data signal is deformed seriously. To further illustrate the significance of off-track noise, consider the information shown in Table 1, below.

TABLE 1

| Signal | Noise | SNR |
|---|---|---|
| 100 | 1 | 100 |
| 95 | 1 | 95 |
| 100 | 6 | 17 |

In the simplified example provided in Table 1, when the signal strength is equal to 100 and the noise is equal to 1 (arbitrary units), the signal-to-noise ratio (SNR) is 100. If the signal strength is degraded by moving off-track by a factor of 5% and the system noise is maintained at 1, the SNR drops accordingly to a level of 95. The more extreme and serious situation arises where no erase band exists for the data tracks, or the erase bands are insufficiently wide. This situation is illustrated by the last entry of Table 1, where the signal strength is 100 but the noise rises to 6. In this case, the SNR drops drastically to a level of 17. Thus, when the head moves off-track such that the noise introduced into the system rises by approximately 5%, the signal-to-noise ratio drops dramatically. It is noise due to the presence of adjacent track information or the presence of old data that typically causes drives to fail. The insurance against such failures is often the erase band of the head.

Prior art adaptive channels determine optimal currents, boost, bandwidth, and threshold parameters that provide the optimal timing margins based only on an on-track error rate. But off-track error rate clearly dominates the head's performance. In other words, past approaches to adaptive channels ignore the interrelationships between the erase bands created by the head with a change in the write current, and the off-track performance of the head. Since the off-track performance dominates the ability of the head to survive in the field, prior art adaptive algorithms which test only on-track performance result in drives that handle shock and vibration inadequately. Recall that immunity to shock and vibration in a head is largely determined by the erase band of the head, which is tied to the write current, as well as the geometry of the head.

Figure 2:
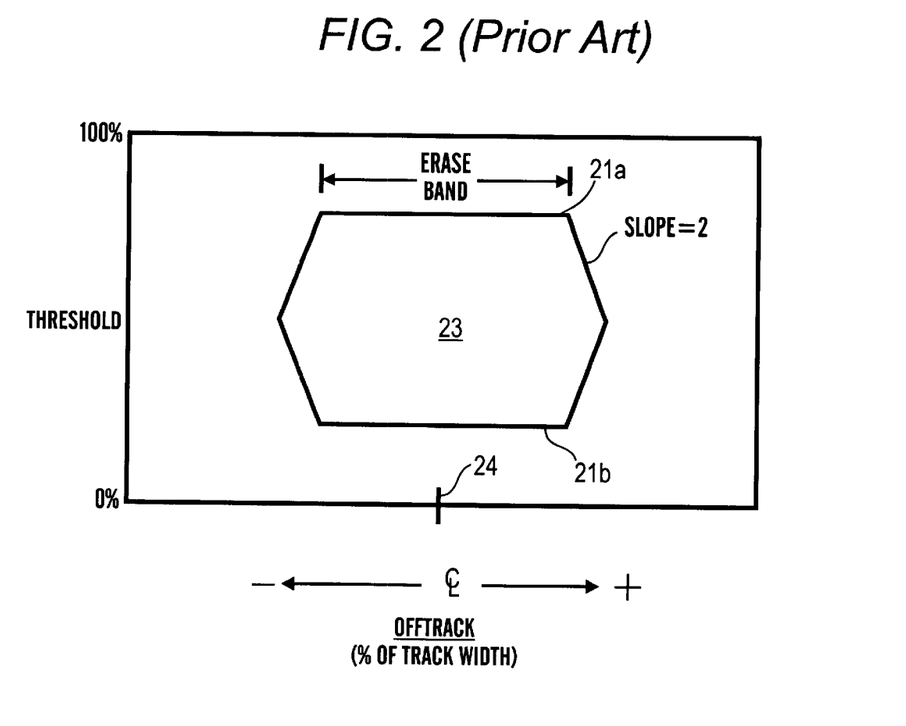
FIG. 2 is a graph illustrating the off-track performance of a typical magnetic recording system.

A model for off-track error rate response is shown in FIG. 2. FIG. 2 is a graph illustrating off-track coherent noise as a function of threshold and off-track position of the head. The centerline position of the track is indicated by position 24 in FIG. 2. The bounded hexagonal space 23 represents the area in which no errors are found at a given error rate. In other words, area 23 represents the conditions under which a head will pass qualification for given error rate.

Figure 3A:
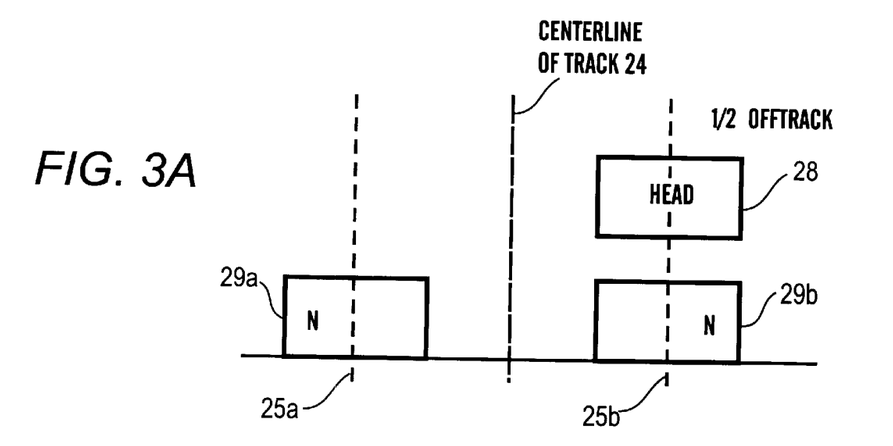
FIGS. 3A–3C illustrate block magnetization with respect to a concentric track of a rotating magnetic medium.
Figure 3B:
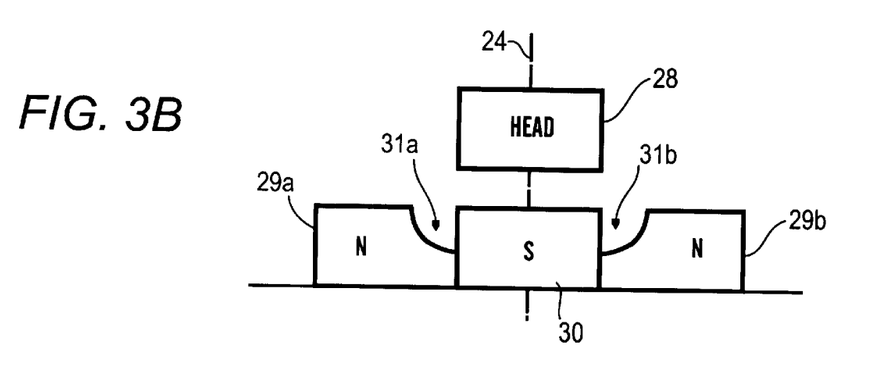
Figure 3C:
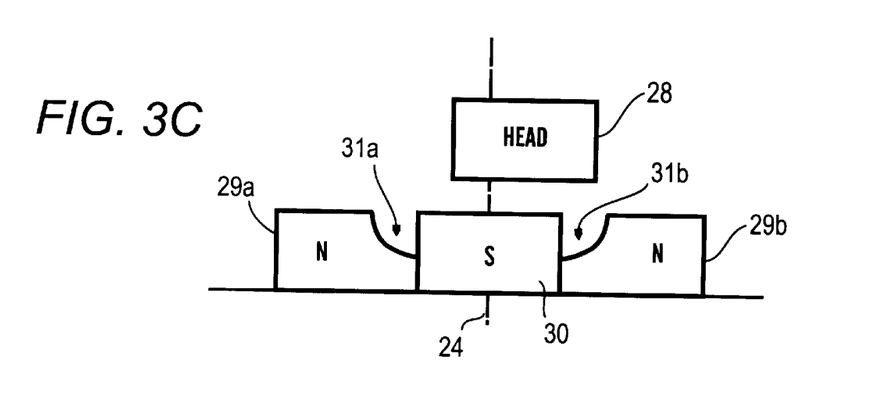

Viewing the graph of FIG. 2 in conjunction with the block diagram of magnetization shown in FIG. 3C (viewed as a cross-section across the track) it is understood that the erase bands created by the fringe fields of the head during writing results in the flat response of the error rate response. This is shown in FIG. 2 by boundary lines 21a and 21b. FIG. 3C, incidentally, illustrates a head 28 positioned slightly off-track of track centerline 24. Off-track noise is illustrated by regions 29a and 29b, with the erase bands being shown by areas 31a and 31b. The desired read signal is shown in FIG. 3C by 20 magnetization region 30.

As can be seen, side reading beyond the influence of the erase bands produces a degradation in the threshold error rate of the system;, where both drop-ins and drop-outs degrade at the same rate (i.e., slope=2) as a result of the amplitude modulation induced by the off-track signal (i.e., N) into the on-track signal (i.e., S). Essentially, what FIG. 2 shows is that as the head moves off-track, the response stays flat in the region within the erase bands. Once the head moves into adjacent track noise, the response begins to collapse from both sides at an equal rate.

It should be understood that if improvements are made in the threshold margin (by means of equalization techniques), and the erase bands physically remain the same size, the head can actually move further off-track without incurring additional errors for given error rate. However, this requires that the nominal threshold be moved up to accommodate this result. One of the central features of the present invention is the concept of improving threshold margins off-track by combining the channel variable write current, $I_w$, with an actual off-track error rate test; that is, linking $I_w$ as a variable to off-track.

According to the optimization algorithm of the present invention, the adaptive channel finds the point between optimum timing margins in the write process and optimum off-track. Because of their geometry, there are certain heads which will never develop an adequate erase band. These heads will always fail since there is no write current or adaptation that will correct for defective geometries. Conversely, there are some heads which have overlapped throats such that the ideal timing margins are produced by a current which is so low that the erase bands shrink, and the off-track margin is sacrificed. In this situation, the optimum settings may not produce the best timing margin, but rather the minimum off-track required for the drive to function, given an acceptable error rate.

The adaptive algorithm of the present invention deliberately moves the heads off-track to test the off-track error rate in order to determine the optimal write current. Hence, the crux of the present invention is the use of off-track margins as the criterion measure of successful optimization of a recording system. Such a system includes not only the readback optimization of boost, bandwidth and threshold, but also the write optimization with variable write current to the head. While write current as an adaptive parameter is well understood, historically, it has only been used to improve timing margins. As discussed above, the optimal settings may not result in the best timing margin, but rather the minimum off-track margin.

The adaptive routine of the present invention incorporates an off-track error rate test, with a variable write current. Implementation of this routine often results in the trade-off of timing margins against off-track margins in recognition of the fact that off-track margins usually dominate the overall error rate capability of the drive. Optimization of read/write channel variables should therefore be verified on an actual off-track error rate check. As will be explained in more detail, this is the criterion measure used in the method of the present invention.

The basic steps of the method of the present invention are illustrated in conjunction with the block magnetization diagrams of FIG. 3A–3C. In determining the adaptive settings which optimize off-track margin, the first step involves writing a noise signal halfway off-track so as to fill the guard bands with noise. Noise is typically written as a data pattern to represent old data recorded on adjacent tracks. This initial step is illustrated in FIG. 3A wherein the centerline of the track is shown by dashed line 24, and the one-half off-track positions are represented by dashed lines 25a and 25b. The noise magnetization regions are illustrated by blocks 29a and 29b. FIG. 3A shows head 28 being positioned over one-half off-track line 25b to produce noise block 29b.

The next step in the adaptive algorithm of the present invention is to position head 28 directly on-track; that is, position head 28 symmetrically about centerline 24. With head 28 positioned over the center of the track, a second data pattern is then written on track. The state of this second data pattern is illustrated in FIG. 3B by magnetization block 30. As might be expected, the writing of the second data pattern on-track erases away any old data which may have been written partially on-track, i.e., under the head. The writing of the second data pattern also erases away a portion of the edge noise regions. Erasing about the edges is caused by the fringing fields of the data write signal; this produces the erase band regions of the track These erase band regions are shown in FIG. 3B as regions 31a and 31b.

Once the signal and noise regions have been written on-track and a certain percentage off-track, respectively, an iterative routine is performed to optimize the read/write channel variables (e.g., $I_w$, boost, BW, threshold), again, utilizing off-track margin as the key criterion measurement. These iterations are generally shown in FIG. 3C which illustrates head 28 being positioned slightly off-track over the erase band 31b. Details of one implementation of the adaptive algorithm of the present invention will now be described.

Figure 4:
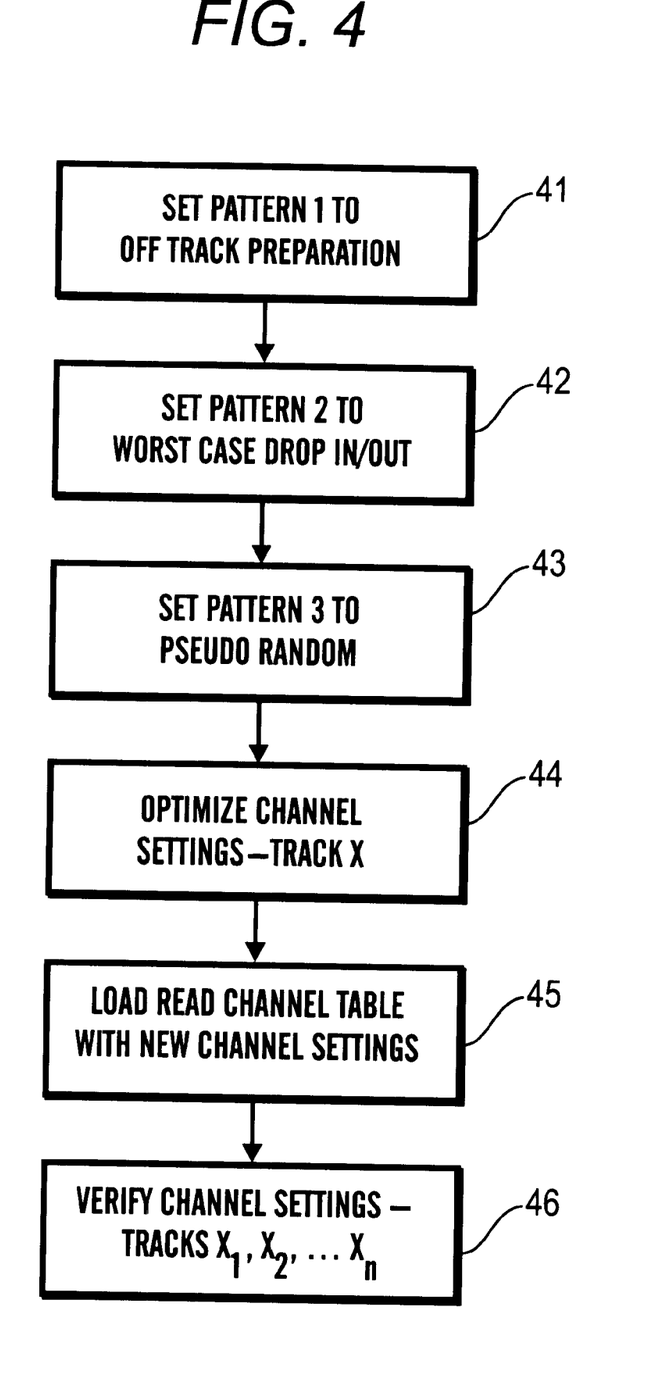
FIG. 4 is a flow chart diagram of one embodiment of the adaptive optimization, routine of the present invention.

FIG. 4 is a flow chart illustrating the adaptive channel optimization algorithm of the present invention as implemented as part of a set of read/write self-test commands. It should be understood, however, that the adaptive channel optimization method of the present invention may be implemented in a variety of ways, thus it is not restricted to a self-test script for a disk drive. For example, the optimization algorithm of the present invention may be employed during manufacturing testing, drive qualification, upon start-up of a field disk drive system, or as a routine to be run periodically over the lifetime of a drive. Therefore, the following description of the present invention should not be considered as limiting the present invention to a specific embodiment or implementation.

In the self-test script of FIG. 4, once a drive has been calibrated, a first data pattern (data pattern 1) may be set for off-track preparation. This step is shown by block 41 of FIG. 4. The off-track preparatory pattern is an alternating polarity and alternating phase pattern that is designed to degrade the on-track performance and simulate worst-case drive conditions. For a current embodiment, the maximum length of this pattern is 8 bytes.

The next step in the sequence is represented by block 42, which indicates set data pattern 2 to worst case drop in/out. The worst case drop/out and drop/in pattern supplies a tri-bit (see FIG. 1) with two undershoots and a DC gap between the bits. This data pattern fills all the remaining bit spacings that are valid with a 1,7 encoding scheme. Again, the maximum length of this pattern in the current embodiment is 8 bytes.

Step 43 indicates set data pattern 3 to pseudo-random. Pattern 3 is a true pseudo-random pattern with the number of bit spacings meeting the associated 1,7 encoding scheme probabilities. The maximum length of this pattern is also 8 bytes long in a current embodiment.

Once the three data patterns have been set, the next step in the self-test script is to optimize the channel settings for a selected track (e.g., track X) of the disk. This step is represented by block 44 in FIG. 4. The optimized channel settings routine finds the combination of write current, boost, and bandwidth from a matrix of values that yields the best performance. In a current embodiment, the performance criterion comprises a weighted combination of off-track margin, threshold margin, and timing margin; the weighted combination being simply referred to as the "quality value". Note that since the present invention incorporates off-track margins as part of the testing routine, the error rate diagnostics of the drive may be changed to accommodate a write-once-read-many test algorithm.

After the optimized channel settings for given track have been determined, read channel settings for all of the tracks across all of the zones of the recording disk can be calculated by scaling the settings for the selected track X. By way of example, the optimum settings for boost, bandwidth and write current may be scaled by multiplying the optimum settings by a fractional multiplier in order to determine the optimum boost, bandwidth, and write current settings for the different recording zones or individual tracks of the disk.

Following calculation of the optimal channel settings across the entire disk surface, those settings are then loaded into a read channel table (RCT) as shown by step 45. FIG. 4 also includes an optional step 46 which involves verifying the channel settings across each of the tracks $X_1, X_2, \ldots X_n$ of the disk, invoking a weighted quality algorithm as required for drive soft error rate performance.

Figure 5:
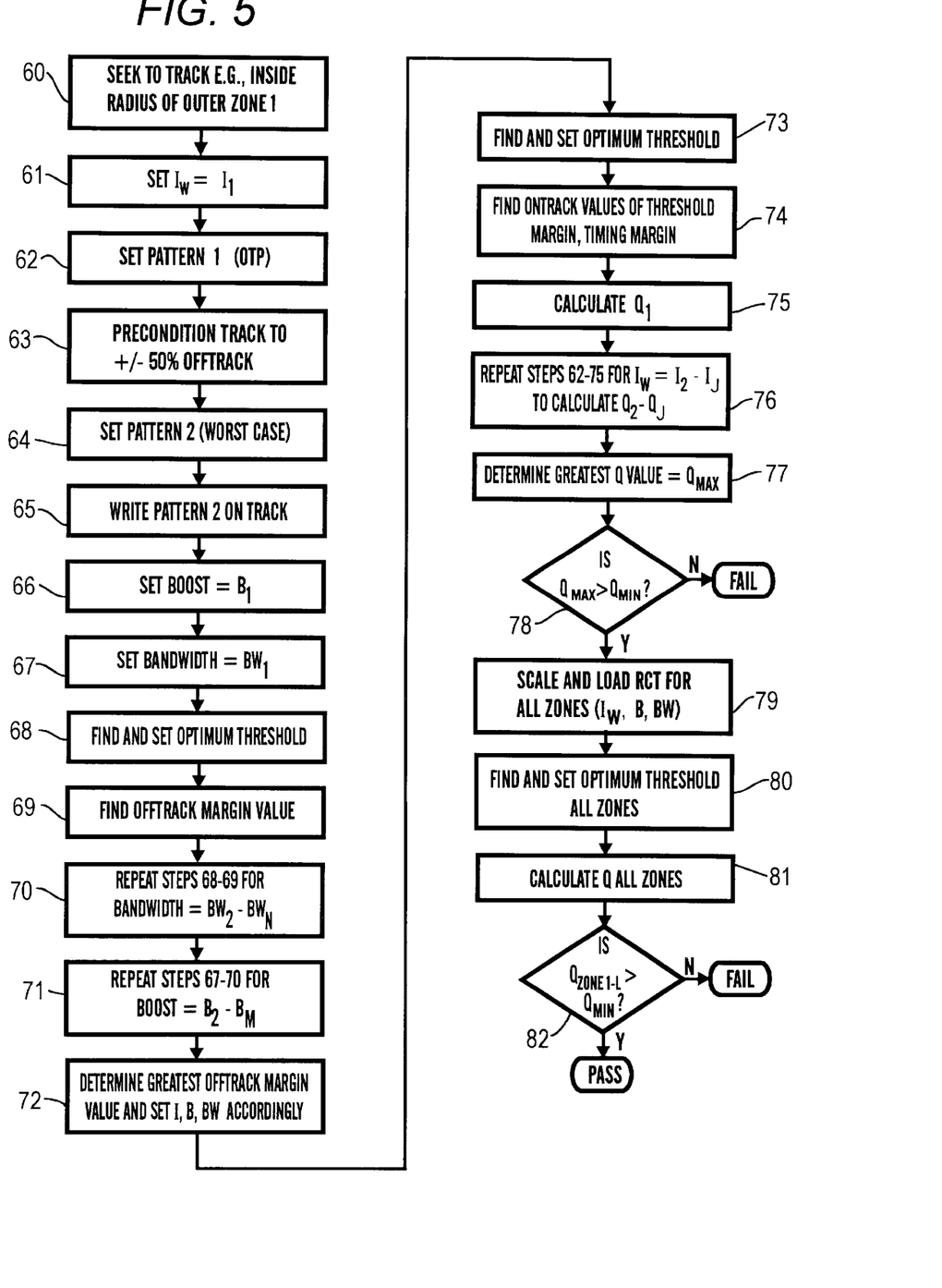
FIG. 5 is a more detailed flow chart of the adaptive algorithm for optimizing channel settings in accordance with a particular embodiment of the present invention.

The basic algorithm for the optimize channel settings routine is shown in the flow chart of FIG. 5. Specific channel variables settings used in a current embodiment of the present invention are provided in Table 2 below.

TABLE 2

| Write Current (mA) | Boost (dB) | Bandwidth (KHz) |
|---|---|---|
| 5 | 5 | 6098 |
| 5 | 7 | 6479 |
| 5 | 9 | 6860 |
|   |   | 7241 |
|   |   | 7622 |
|   |   | 8002 |
|   |   | 8382 |
|   |   | 8764 |
|   |   | 9146 |
| 7 | 5 | 5435 |
| 7 | 7 | 5775 |
| 7 | 9 | 6114 |
|   |   | 6454 |
|   |   | 6793 |
|   |   | 7133 |
|   |   | 7471 |
|   |   | 7812 |
|   |   | 8152 |
| 12 | 5 | 5137 |
| 12 | 7 | 5458 |
| 12 | 9 | 5779 |
|   |   | 6100 |
|   |   | 6421 |
|   |   | 6742 |
|   |   | 7062 |
|   |   | 7384 |
|   |   | 7705 |

Optimized channel settings are determined based on a matrix comprising three different boost settings and a variety of bandwidth settings. For a particular write current setting, a set of nine different bandwidths are utilized for three different boost settings. Then, the write current is changed to a different setting, and a another set of nine bandwidths is utilized for each of the various boost settings, and so on. It should be understood that the particular settings given in Table 2 represent channel settings selected for a particular head (e.g., a Yamaha head; 300 nsec. pulse peak to leading undershoot at CYL.508,455 IN/SEC VEL). It is appreciated that different heads may require different settings.

It is also worth noting that there is no specific requirement on the number of current settings, boost settings, or bandwidth settings; i.e., the number of iterative settings. The number of iterations of each channel variable may be increased or decreased depending on the particular precision desired in determining optimal channel settings for the drive.

Referring now to FIG. 5, the initial step 60 of the optimize channel settings routine involves seeking the head to a particular track over the recording medium. By way of example, the inside radius of the outermost recording zone of the disk provides a convenient reference track for determining optimal channel settings. Next, the first write current is set, as indicated by step 61. For example, Table 2 show an initial write current setting of 5 milliamperes (mA).

Following the setting of the write current, data pattern 1 is set to off-track preparation (OTP). This step is shown by block 62 in the flow chart of FIG. 5. Setting the off-track precondition involves formatting a track and writing the track to a certain percentage of off-track on one side of the track, and then repeating the same formatting and writing process on the other side of the track. This is shown by way of illustration in FIG. 3A for a 50% off-track setting. The percentage of off-track, of course, may vary depending on user definitions. The formatting and writing of the track to +/−50% off-track is shown in block 63.

Next, a worst case data pattern is written on-track as indicated by step 64. This step corresponds to the block magnetization diagram illustrated in FIG. 3B, in which head 28 writes worst case signal pattern 30 onto the centerline 24 of the track. The actual writing of the worst case pattern track is shown occurring in FIG. 5 by step 65.

With data patterns 1 and 2 written to the track, the next step in the algorithm involves setting the boost level (=$B_1$), as indicated by step 66. With the boost level set through an initial value $B_1$, the bandwidth is also set to an initial frequency (=$BW_1$) as shown in step 67.

The next step in the method of optimization illustrated by FIG. 5 involves finding and setting the optimum threshold level (step 68). This is done by finding the threshold that is exactly halfway between the upper threshold and the lower threshold that produces a specified error rate. By way of example, one way to find this level is to strobe down the threshold from a maximum level until the error rate is achieved. The level of threshold that results in this condition (threshold high) is then stored. Threshold is then strobed from a minimum high level until the same error rate is achieved. The second threshold level (threshold low) is then subtracted from the first threshold level (threshold high—threshold low). The optimum center threshold is then calculated as being equal to the low threshold level plus the difference between the high threshold level minus the low threshold level divided by two. Mathematically this is represented as $$TH=\text{low}+(\text{high}-\text{low})/2$$

Note that the threshold margin is calculated by subtracting the high threshold level from the low threshold level and then normalizing, as a percent, to the entire threshold range (100%).

Once the optimal threshold level has been set, as in step 68, the next step (step 69) involves finding the off-track margin value. The determination of the off-track margin is handled by a routine which determines how far off-track the head may go while ill meeting a specified error rate. This may be found, for instance, by successively moving the head off-track relative to the center of the track toward either the inside diameter or outside diameter of the disk until a specified error rate is achieved.

A more complete routine for off-track margin determination involves determining the off-track distance from the centerline by strobing the head successively off-track toward the inside diameter, and then repeating the same test strobing the head off-track toward the outside diameter until the defined error rate is achieved. The direction that results in the minimum off-track distance is then isolated, multiplied by 2, and normalized as a percentage to the total track-to-track spacing of 100%. This calculated percentage the off-track margin at the defined error rate.

Once the off-track margin value has been determined, steps 68 and 69 are repeated for successive iterations of bandwidth frequencies (=$BW_2$–$BW_n$, where n is an integer greater than 1). This repeated iteration of bandwidths is illustrated as step 70 of FIG. 5. For a current embodiment, nine different bandwidth values are used to find nine different off-track margin values.

Step 71 illustrates that the next operation to be performed in the algorithm of FIG. 5 involves repeating steps 67 to 70 for boost values B=$B_2$–$B_m$, where m is an integer greater than 1. In other words, a matrix of information is assembled in which off-track margin values are calculated not only for different bandwidth settings, but also for different boost levels. In a current embodiment, three different boost levels are utilized. At the completion of step 71, a total of n×m off-track margin values will have been determined.

Up to this point, it should be understood that the write current level has been kept constant at a level $I_w$=$I_1$; that is, all of the iterative calculations made up to now have utilized the initial current level selected in step 61. Following the generation of matrix off-track margin values, step 72 comprises determining the greatest off-track margin value. After the greatest off-track margin value has been isolated, the write current, boost and bandwidth values which produced the greatest off-track margin value are set accordingly.

The next step in the sequence, step 73, involves finding and setting the optimal threshold utilizing the parametric values for write current, boost and bandwidth as determined in step 72. The optimum threshold determination is the same as described earlier in conjunction with step 68. Using this optimum threshold value, step 64 then consists of finding on-track values of threshold margin and timing margin, again for the set of channel variables ($I_w$, B and BW) determined in step 72.

Timing margin is determined as a function of how wide a timing window can be utilized while achieving a specified error rate. The routine for finding timing margin comprises strobing the window early until the defined error rate is achieved. This level of window strobing is then saved. The window is then strobed late until the defined error rate is again produced. The late window value is then subtracted from the early window value and compared to the normalized total window of 100%. The calculated percentage of total window represents the timing window margin at the defined threshold error rate.

Summarizing the results produced up to this point in the optimization routine, the greatest off-track margin value has been identified from the matrix of values generated by steps 66–72. Also, the on-track values of threshold margin and timing margin have been determined based on the parametric values established in step 72. With this information at hand, an initial quality value, $Q_1$, may be calculated. The calculation of an initial quality value $Q_1$ is illustrated in step 75. The quality value represents a weighted combination of off-track margin, threshold margin, and timing margin. The formula employed in a current embodiment is given as $$Q=(K_1 \times OTM)+(K_2 \times THM)+(K_3 \times TM)$$

where Q equals the quality value, OTM represents the off-track margin in percent of track-to-track spacing, THM represents the threshold margin as a percent of the entire threshold range, TM is the timing margin as a percent of the entire window range, and $K_1$, $K_2$ and $K_3$ represent the weighting values for off-track margin, threshold margin, and timing margin, respectively. Practitioners in the art will appreciate that the above formula incorporates the ability to selectively enable and disable each of the margin routine results, thus providing tremendous flexibility in the adaptive optimization routine.

With continuing reference to FIG. 5, step 76 involves repeating steps 62–75 for write current values $I_w=I_2-I_j$, where j is an integer greater than 1. For each of the $I_w$ values, a corresponding quality value will be calculated. This means that upon completion of step 76 there will be j different Q values corresponding to the j different write current values iterated. It should be understood that the j different quality values are extracted from a matrix of parametric variables; namely a write current, boost and bandwidth which produces a total of n×m×j different off-track margin values. Each of these off-track margin values represents a criterion with which to measure the error rate response of the disk drive. The optimized channel settings routine is culminated in step 77 which involves determining the greatest Q value from the calculated values $Q_1-Q_j$. The greatest Q value is designated as $Q_{max}$.

Determination of a $Q_{max}$ value for the channel allows the disk drive to be qualified. Step 78 involves comparing the $Q_{max}$ value determined in-step 77 with a specified minimum Q value. For example, the minimum Q value, $Q_{min}$, normally represents the lowest acceptable performance level of the drive. If $Q_{max}$ fails to exceed $Q_{min}$, the drive will be designated as failing qualification. As explained earlier, there are many reasons why a drive might fail when the measurement criterion includes off-track margin. Probably the most common mode of failure involves defects in the head geometry itself.

Should it be determined that $Q_{max}$ exceeds $Q_{min}$, then a read channel table (RCT) of variable values may be constructed. The RCT comprises settings for each of the variables $I_w$, B, BW. In a current embodiment, the RCT is generated by utilizing the information obtained for the track selected in step 60 (track X), and then scaling these values of $I_w$, B, BW for all of the zones on the disk Since the optimized channel settings routine need only be run in one zone of the disk, the load RCT step 79 enables some level of control over the RCT settings in other zones based upon the results determined for a single zone.

In other words, since most disks are divided into separate recording zones from the outside diameter to the inside diameter of the disk, the read channel settings determined for the outer zone of the disk may be scaled by multiplying those parametric values by an appropriate scaling factor to arrive at read channel variable settings for each of the recording zones running from the outside diameter to the inside diameter of the disk. Obviously, generating a read channel table of variable settings means that all of the concentric tracks on the disk will be assigned a set of channel variables that optimize the performance of the drive.

As an example, a scaling routine for the different zones of the disk may utilize a scaling factor proportional to the known flying height variation of the head above the disk for the purposes of scaling write current and boost. A different scaling factor proportional to data rate may be used to scale the filter bandwidth setting across the different zones of the disk. It is appreciated that the scaling factors are particularized depending on the specific application of the drive, the drive specifications, recording density, etc. Therefore, the scaling factors selected for one type of disk drive might not be the same for a different type of disk drive having different specifications.

Following the completion of step 79, further qualification of the drive may be made by finding and setting the optimum threshold for all of the zones on the disk, as illustrated by step 80. With optimum threshold levels in place for all zones at the disk, a set of quality values may then be calculated for all of the zones on the disk. The same process that was used to qualify the drive as described by step 78, may also be employed to generate a quality value for each of the zones of the disk This is shown by step 82 in which the quality factor for zones 1-L is compared with the minimum quality factor $Q_{min}$. If the quality value from any one of the zones falls below the minimum quality level, the drive will be classified as a failure. Otherwise, if $Q_{zone1}$ through $Q_{zoneL}$ exceeds $Q_{min}$ the drive will pass qualification.

It is appreciated that a failed drive might be salvaged by executing the entire optimization routine (steps 60–78) in a failed zone since it is entirely possible that the chosen scaling factors may be in error.

Figure 6:
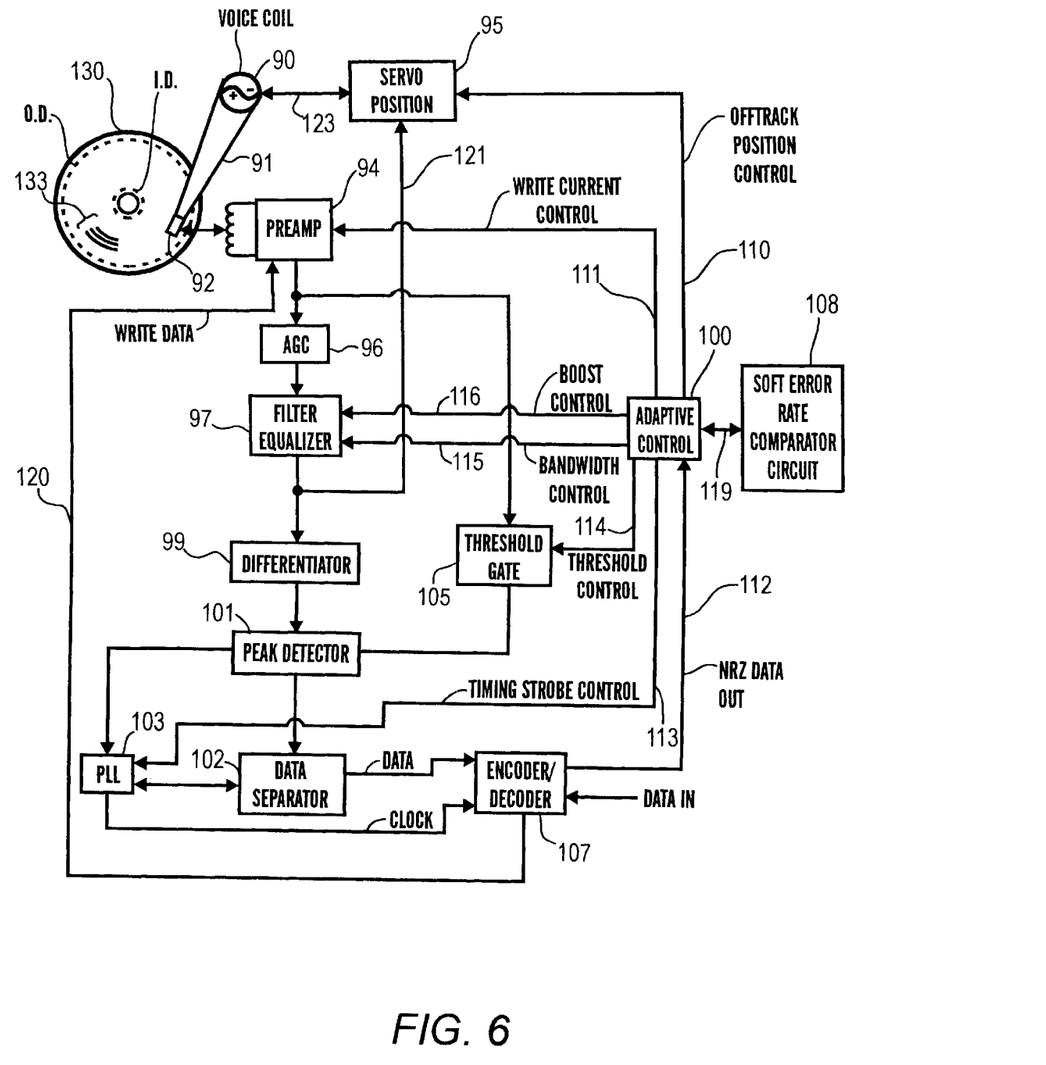
FIG. 6 is a block diagram illustrating the data channel and adaptive circuitry of the present invention.

FIG. 6 illustrates the data channel and adaptive circuit for a particular embodiment of the present invention. The block diagram of FIG. 6 includes an actuator 91 that positions one or more transducers 92 over a selected data track (e.g., one of tracks 133) of disk 130. Typically, a voice coil 90 controls the movement of actuator 91 so as to position transducer 92 radially between the inside diameter (I.D.) and outside diameter (O.D.) of disk 130. It is understood that tracks 133 are formed concentrically around disk 130.

Block 95 in FIG. 6 represents the servo position control circuitry which used to identify the location of transducer 92 relative to the tracks of the disk. The servo control circuitry is also utilized for positioning transducer 92 over a selected track by providing an actuating current to voice coil 90 along signal line 123. In a current implementation, disk 130 is patterned with an embedded servo pattern such that servo information is retrieved during the readback of data from disk 130. This is represented in FIG. 6 by line 121 which provides embedded servo information to block 95 from the read channel circuitry.

Information is transferred to the surface of magnetic disk 130 through the write channel circuit which includes encoder/decoder unit 107. A frequency-modulation encoding scheme is commonly used to combine the input data with clocks, which are then coupled to preamplifier 94, as a write data signal on line 120. Preamplifier 94 transfers the write data signal to transducer 92. Current drivers within preamplifier 94 drive the write data to transducer 92. The current energizes the coil of the transducer to create flux reversals on the surface of magnetic disk 130. In accordance with well-understood encoding schemes, 1s and bit cell boundaries (clock) are assigned to flux reversals, while 0s indicate no flux reversals. By way of example, a 1,7 run length limited encoding scheme may be employed, providing advantages of easy self-clocking and high data storage capacity.

Once a combination of variable control signal settings has been established for a selected track of the disk adaptive control unit 100 provides the appropriate control signals to the data channel to establish the proper combination of data channel variable settings. For example, during the writing process, adaptive control unit 100 provides a control signal along line 111 to preamplifier 94. The control signal on line 111 adjusts the write current In accordance with the adaptive algorithm of the present invention. As is further shown, adaptive control unit 100 also provides boost control and bandwidth control signals to the read channel circuitry along lines 116 and 115, respectively.

During readback the read channel circuitry converts the voltage waveform received from the transducer or head to a square waveform which should be the same as the original modified frequency modulation signal. In FIG. 6, the voltage waveform of the head output signal is received by preamplifier 94 which amplifies the signal and provides an output signal to automatic gain control (AGC) unit 96 and threshold gate block 105. AGC unit 96 is coupled to filter equalizer block 97. The equalizer circuitry provides compensation and pulse slimming of the amplified head output signal. Practitioners in the field of magnetic recording appreciate that the equalizer is a critical factor in the read channel, and is often used to minimized the effects of peak shifts. The data channel variables of boost and bandwidth are controlled by adaptive control unit 100 by control signals coupled to equalizer block 97, as is shown in FIG. 6 by lines 116 and 115, respectively.

The equalized output signal is coupled to differentiator 99 and peak detector 101. The differentiator and peak detection circuitry produce a digital signal which is then transmitted to the data separator 102. Data separator 102 separates data signals from clock signals by establishing a timing window. This separation is achieved by generating window pulses from the readout digital signals. A phase-locked loop (PLL) 103 is utilized to establish synchronization with the data and to continue to generate window pulses. The data and clock signals are then coupled to encoder/decoder block 107, which provides non-return-to-zero (NRZ) output data to the adaptive control module along line 112. It should be understood that the NRZ output data is also normally coupled to an output data bus.

In another embodiment, the differentiator, peak detector, and threshold gate circuitry may be replaced by circuit known as a partial response maximum likelihood (PRML) channel circuit. In an embodiment incorporating PRML channel circuitry, adaptive control would still be provided by adaptive control unit 100.

In accordance with the present invention, the adaptive control block 100 comprises a programmable integrated circuit which can be programmed externally; that is, from outside the drive. Block 100 includes the read channel table (RCT) information generated from the adaptive process described earlier. The RCT settings may be stored in a variety of memory devices such as a read-only memory (ROM). In a currently preferred embodiment, block 100 comprises a circuit module consisting of three separate integrated circuits: an Intel HC196 microprocessor, an Adaptec PCMCIA/AT controller circuit and a custom digital ROM that stores a firmware program which implements the adaptive algorithm of the present invention. The ROM also stores the read channel table information. Module 100 is incorporated on the same printed circuit board as the data channel circuitry itself in a preferred embodiment When adaptive module 100 has been programmed to generate adaptives for the drive, block 100 executes the firmware program which iterates through a matrix of channel variable settings as described in conjunction with FIG. 5. FIG. 6 illustrates servo position block 95 receiving position signals from the actuator and from the head signal, which reads servo burst information from the embedded servo pattern. Block 95 also receives the off-track position control signal from adaptive control block 100 along line 110. The off-track position control signal provided along line 110 controls how far off-track head 92 is positioned during off-track writing, and also during off-track margin measurements. Threshold control and timing strobe control is provided by block 100 along lines 114 and 113, respectively. Line 114 is coupled to threshold gate block 105 which establishes the threshold level of the read channel data signal. The timing strobe control signal provided on line 113 coupled to PLL 103 adjusts the early and late edges of the timing window.

Also shown in FIG. 6 is a soft error rate comparator circuit 108. Circuit 108 compares the NRZ data read from disk 130 with the data pattern originally written. A flag signal is provided on line 119 whenever a predetermined error rate is exceeded. As discussed previously, off-track margin, timing margin and threshold margin are each determined as against a specified soft error rate. The measurement criterion that is used to determine whether the data channel has successfully adapted involves measuring the real soft error rate while positioning the head off-track some amount, or varying the threshold, or varying the timing strobe, or some combination of all three. To produce optimized data channel performance, adaptive control unit 100 controls and sets the data channel variables of bandwidth, boost, and write current (ultimately some nominal threshold level as well).

Whereas many alternations and modifications to the present invention will no doubt become apparent to a person of ordinary skill in the art after having read the foregoing description, it is to be understood that the particular embodiments shown and described by way of illustration are in no way intended to be limiting. Therefore, reference to the details of the illustrated diagrams is not Intended to limit the scope of the claims which themselves recite only those features regarded as essential to the invention.

We claim:

1. In a disk drive including a recording head for reading/writing information to/from a rotating magnetic disk having a plurality of concentric tracks, a method of adaptive channel optimization comprising the steps of:

(a) seeking to a selected track of said disk;

(b) setting an initial write current, $I_w=I_1$;

(c) preconditioning said selected track by writing a first pattern to opposite sides of said selected track a predetermined distance off-track;

(d) writing a second data pattern centered on said selected track;

(e) setting an initial boost level, $B=B_1$;

(f) setting an initial bandwidth, $BW=BW_1$;

(g) setting an optimum threshold that is approximately half-way between upper and lower thresholds that produce a first error rate;

(h) determining an off-track margin as a function of how far off-track said head may be positioned while meeting a second error rate;

(i) repeating steps (g) and (h) for bandwidths $BW_2$ through $BW_n$, where n is an integer greater than one;

(j) repeating steps (f)–(i) for boost levels $B_2$ through $B_m$, where m is an integer greater than one;

(k) determining the greatest off-track margin value resulting from steps (g)–(j) and setting $I_w$, B, and BW accordingly;

(l) repeating step (g) using the settings of $I_w$, B, and BW of step (k); and (m) determining on-track values of threshold margin and timing margin at said second error rate and a third error rate, respectively.

2. The method of claim 1 further comprising the step of:

(n) calculating a quality value, $Q_1$, as a weighted combination of said off-track margin, said threshold margin and said timing margin.

3. The method of claim 2 wherein said quality value is given by the equation:

$$Q_1 = (K_1 \times OTM) + (K_2 \times THM) + (K_3 \times TM)$$

where $K_1$, $K_2$ and $K_3$ are weighting values;

OTM represents said off-track margin in percent of track-to-track spacing;

THM represents said threshold margin in percent of entire threshold range; and

TM represents said timing margin in percent of entire window range.

4. The method of claim 2 further comprising the steps of:

(m) repeating steps (c)–(n) for $I_w = I_2$ through $I_j$ to calculate $Q_2$ through $Q_j$, respectively, where j is an integer greater than one; and (n) selecting a greatest quality value, $Q_{max}$, from $Q_1$ through $Q_j$.

5. The method of claim 4 further comprising the steps of:

(o) recording optimum values of $I_w$, B, and BW which produce said greatest quality value; and (p) scaling said optimal values of $I_w$, B, and BW to generate a set of corresponding optimal values for each of said plurality of tracks.

6. The method of claim 5 further comprising the steps of:

(q) finding and setting a set of optimum thresholds corresponding to said set of optimal values for each of said plurality of tracks; and (r) calculating a maximum quality value for each of said plurality of tracks.

7. The method of claim 6 further comprising the step of:

qualifying said disk drive by determining whether said maximum quality value for each of said plurality of tracks exceeds a minimum specified quality value.

8. The method of claim 4 further comprising the step of:

qualifying said disk drive by determining whether $Q_{max}$ exceeds a minimum specified quality value $Q_{min}$.

9. The method of claim 4 wherein n=9.

10. The method of claim 9 wherein m=3.

11. The method of claim 10 wherein j=3.

12. The method of claim 1 wherein said first, second and third error rates are equal.

13. The method of claims 1, 2, 3, 4, 5, 6, 7, 8, 9, 10 or 11 wherein said predetermined distance is approximately equal to 50% of the width of said selected track.

14. A disk drive, comprising:

a magnetic medium;

means for transferring data to and from said medium; and control means coupled to said transferring means for determining an optimal combination of settings for a plurality of parameters which affect the recording performance of said transferring means by iterating through a matrix of different settings of said parameters using off-track margin as a measurement criterion.

15. The disk drive of claim 14 wherein said plurality of parameters comprises write current.

16. The disk drive of claim 15 wherein said plurality of parameters comprises boost.

17. The disk drive of claim 16 wherein said plurality of parameters further comprises bandwidth.

18. An electronic circuit for transferring information to/from a magnetic medium of a disk drive of a type which employs an actuator to position a transducer over a track of said medium, comprising:

means coupled to said transducer for amplifying a voltage waveform received from said transducer to produce an amplified read waveform, and for energizing said transducer with a current to transfer write data to said medium;

means for equalizing said amplified read waveform to produce an equalized waveform;

means for differentiating and peak-detecting said equalized waveform to produce a digital signal;

means for separating said digital signal into data and clock signals by establishing a timing window; and an adaptive circuit generating a first signal coupled to said amplifying means, and second and third signals coupled to said equalizer means, with said first signal controlling the magnitude of said current and said second and third signals controlling the boost and bandwidth of said equalized waveform to optimize the recording performance of said disk drive for said track using off-track margin as a measurement criterion.

19. The electronic circuit of claim 18 further comprising a means for gating said digital signal with a threshold.

20. The electronic circuit of claim 19 wherein said adaptive circuit further generates a fifth and sixth signal coupled to said gating means and said separating means, respectively, said fifth signal controlling said threshold and said sixth signal controlling said timing window.

21. The electronic circuit of claim 20 wherein said adaptive circuit comprises a microprocessor.

22. The electronic circuit of claim 18 further comprising means coupled to said separating means for decoding said data signal into an output data bit stream and for encoding said clock signal with an input data bit stream for transfer to said medium.

23. The electronic circuit of claim 22 wherein said adaptive circuit is coupled to receive said output data bit stream from said decoding means and further comprising a comparator circuit coupled to said adaptive circuit for providing a flag signal to said adaptive circuit when said output data bit stream exceeds a specified error rate.

24. The electronic circuit of claim 18 further comprising servo position means coupled to said actuator for controlling the position of said transducer.

25. The electronic circuit of claim 24 wherein said medium includes an embedded servo pattern.

26. The electronic circuit of claim 25 wherein said servo position means is coupled to receive said servo pattern from said equalized waveform to identify the location of said transducer relative to said track.

27. The electronic circuit of claim 26 wherein said adaptive circuit further generates a fourth signal coupled to said servo position means, said fourth signal controlling the off-track position of said transducer.

28. The electronic circuit of claim 18 wherein said separating means comprises a phase-locked loop to establish synchronization with said clock signal.

29. The electronic circuit of claims 18, 19, 22, 24, 25, 26, 27, 28, 20 or 21 wherein said measurement criterion comprises a weighted sum of a timing margin, a threshold margin and said off-track margin.

30. A disk drive comprising:
   a magnetic data storage medium having a plurality of data tracks;
   a transducer;
   means for positioning said transducer over a selected data track of said medium;
   a data channel coupled to said transducer effectuating data recording to/from said selected data track, said data channel producing a read data signal during reading of data from said medium and a write data signal during writing of data to said medium, the recording performance of said data channel being affected by a plurality of variable control signals; and
   an apparatus coupled to said data channel generating a combination of settings for said variable control signals, said combination optimizing the recording performance of said data channel for said selected track by utilizing a measurement criterion which includes off-track margin.

31. The disk drive of claim 30 wherein said plurality of variable control signals comprises write current.

32. The disk drive of claim 30 wherein said plurality of variable control signals comprises write current, boost and bandwidth.

33. The disk drive of claim 32 wherein said measurement criterion comprises a weighted sum of a timing margin, a threshold margin and said off-track margin.

34. The disk drive of claim 33 wherein said apparatus comprises a unit for executing a program of instructions.

35. The disk drive of claim 33 wherein said apparatus comprises a microprocessor.

36. The disk drive of claim 30 further comprising a read-only memory (ROM) storing said combination of settings.

37. The disk drive of claim 36 wherein said program iterates through a matrix of different settings of said variable control signals.

38. The disk drive of claim 37 wherein said measurement criterion comprises a weighted sum of a timing margin, a threshold margin and said off-track margin.

39. The disk drive of claim 38 wherein said apparatus generates a position control signal coupled to said positioning means to position said transducer off of said selected track in response to execution of a program.

40. The disk drive of claims 30, 31, 32, 33, 34, 35, 36, 37, 38 or 39 further comprising a comparator circuit for comparing said criterion against a predetermined error rate.

41. In a disk drive which employs an actuator to position a transducer over a selected track of a magnetic recording medium, a data channel for information transfer to/from said magnetic recording medium comprising:
   means coupled to said transducer for amplifying a voltage waveform received from said transducer to produce an amplified read waveform, and for energizing said transducer with a current to transfer write data to said medium;
   an equalizer coupled to said amplifier means for producing an equalized waveform from said amplified read waveform;
   a partial response maximum likelihood (PRML) circuit coupled to said equalizer, said PRML circuit generating a digital signal from said equalized waveform; and
   an adaptive circuit generating a first signal coupled to said amplifying means, and second and third signals coupled to said equalizer, with said first signal controlling the magnitude of said current and said second and third signals controlling the boost and bandwidth of said equalized waveform to optimize the recording performance of said disk drive for said track using off-track margin as a measurement criterion.

42. The data channel of claim 41 further comprising a data separator coupled to said PRML circuit, said data separator separating said digital signal into data and clock signals by establishing a timing window.

43. The data channel of claim 42 wherein said data separator comprises a phase-locked loop for establishing synchronization with said clock signal.

44. The data channel of claim 41 further comprising servo position means coupled to said actuator for controlling the position of said transducer.

45. The data channel of claim 44 wherein said selected track includes an embedded servo pattern.

46. The data channel of claim 45 wherein said servo position means is coupled to receive said servo pattern from said equalized waveform to identify the location of said transducer relative to said selected track.

47. The data channel of claim 41 wherein said adaptive circuit further generates a fourth signal coupled to said servo position means, said fourth signal controlling the off-track position of said transducer.

48. The data channel of claims 41, 42, 44, 45, 46, 47 or 43 wherein said adaptive circuit comprises a microprocessor.

* * * * *